United States Patent
Ha

(10) Patent No.: US 10,867,049 B2
(45) Date of Patent: *Dec. 15, 2020

(54) DYNAMIC SECURITY MODULE TERMINAL DEVICE AND METHOD OF OPERATING SAME

(71) Applicant: EVERSPIN CORP., Seoul (KR)

(72) Inventor: Young Bin Ha, Seoul (KR)

(73) Assignee: EVERSPIN CORP., Seoul (KR)

(*) Notice: Subject to any disclaimer, the term of this patent is extended or adjusted under 35 U.S.C. 154(b) by 81 days.

This patent is subject to a terminal disclaimer.

(21) Appl. No.: 15/701,787

(22) Filed: Sep. 12, 2017

(65) Prior Publication Data

US 2018/0012025 A1    Jan. 11, 2018

Related U.S. Application Data

(63) Continuation of application No. PCT/KR2016/002536, filed on Mar. 14, 2016.

(30) Foreign Application Priority Data

Mar. 13, 2015  (KR) .................. 10-2015-0035177
Mar. 14, 2016  (KR) .................. 10-2016-0030571

(51) Int. Cl.
*G06F 21/57*     (2013.01)
*G06F 21/51*     (2013.01)
(Continued)

(52) U.S. Cl.
CPC ............ *G06F 21/577* (2013.01); *G06F 21/14* (2013.01); *G06F 21/50* (2013.01); *G06F 21/51* (2013.01);
(Continued)

(58) Field of Classification Search
CPC .... G06F 21/577; G06F 21/567; G06F 21/566; G06F 21/554; G06F 21/14; G06F 21/54;
(Continued)

(56) References Cited

U.S. PATENT DOCUMENTS 5,708,709 A  *  1/1998  Rose .................... G06F 8/61
                                                  380/30
9,087,189 B1 *  7/2015  Koeten .................. H04L 67/10
(Continued)

FOREIGN PATENT DOCUMENTS

KR    10-2003-0003593 A    1/2003
KR    10-1134217 B1         4/2012
(Continued)

*Primary Examiner* — Meng Li
(74) *Attorney, Agent, or Firm* — Nelson Mullins Riley & Scarborough LLP; Kongsik Kim, Esq.

(57) ABSTRACT

Disclosed herein are a dynamic security module terminal device for receiving a dynamic security module and transmitting a security management event to a security server, and a method of operating the dynamic security module terminal device. The dynamic security module terminal device includes a communication unit configured to transmit and receive a security management event over a network, and a processor configured to control the communication unit. The processor is configured to create a security session with a security server, and to receive the dynamic security module from the security server so that part or all of code of the dynamic security module performing security management has a predetermined valid period.

16 Claims, 5 Drawing Sheets

(51) Int. Cl.
*G06F 21/52* (2013.01)
*G06F 21/50* (2013.01)
*H04L 29/08* (2006.01)
*G06F 21/56* (2013.01)
*G06F 21/14* (2013.01)
*G06F 21/55* (2013.01)
*H04L 29/06* (2006.01)
*G06F 21/54* (2013.01)

(52) U.S. Cl.
CPC .............. *G06F 21/52* (2013.01); *G06F 21/54* (2013.01); *G06F 21/554* (2013.01); *G06F 21/566* (2013.01); *G06F 21/567* (2013.01); *G06F 21/57* (2013.01); *H04L 63/1425* (2013.01); *H04L 63/1433* (2013.01); *H04L 63/1441* (2013.01); *H04L 67/141* (2013.01); *H04L 67/146* (2013.01); *G06F 2221/033* (2013.01); *G06F 2221/2137* (2013.01); *H04L 63/20* (2013.01); *H04L 67/14* (2013.01)

(58) Field of Classification Search
CPC .......... G06F 21/57; G06F 21/52; G06F 21/51; G06F 21/50; G06F 2221/2137; G06F 2221/033; H04L 67/141; H04L 67/146; H04L 63/1425; H04L 63/1441; H04L 63/1433; H04L 67/14; H04L 63/20
See application file for complete search history.

(56) References Cited

U.S. PATENT DOCUMENTS

| | | | |
|---|---|---|---|
| 2004/0003278 A1* | 1/2004 | Chen | G06F 21/14 726/21 |
| 2004/0103323 A1* | 5/2004 | Dominic | H04L 63/126 726/4 |
| 2005/0187674 A1* | 8/2005 | Ando | G06F 8/61 701/1 |
| 2007/0067301 A1* | 3/2007 | Malik | G06F 21/6218 |
| 2008/0052766 A1* | 2/2008 | Esperet | H04L 63/0272 726/3 |
| 2010/0281273 A1* | 11/2010 | Lee | F04B 33/00 713/190 |
| 2014/0283038 A1* | 9/2014 | Call | H04L 63/1441 726/22 |
| 2015/0067830 A1* | 3/2015 | Johansson | G06Q 30/0601 726/22 |

FOREIGN PATENT DOCUMENTS

| | | |
|---|---|---|
| KR | 10-2013-0101657 A | 9/2013 |
| KR | 10-1308703 B1 | 9/2013 |
| KR | 10-2014-0023098 A | 2/2014 |
| KR | 10-2014-0071744 A | 6/2014 |

* cited by examiner

FIG. 3

| session_id | param1 | param2 | param3 | state1 | state2 |
|---|---|---|---|---|---|
| 11836381 | A | B | C | 1 | 2 |
| 72365784 | C | B | A | 0 | 3 |
| 87656501 | B | A | C | 3 | 2 |

DYNAMIC SECURITY MODULE TERMINAL DEVICE AND METHOD OF OPERATING SAME

CROSS-REFERENCE TO RELATED APPLICATION

This application is a continuation of PCT/KR2016/002536 filed on Mar. 14, 2016, which claims priority to Korean Patent Application Nos. 10-2015-0035177 and 10-2016-0030571 filed on Mar. 13, 2015 and Mar. 14, 2016, respectively, which applications are incorporated herein by reference.

TECHNICAL FIELD

The present invention relates to a dynamic security module terminal device and a method of operating the same, and more specifically to a dynamic security module terminal device and a method of operating the same, in which dynamic security modules in each of which part or all of the code performing security management has a predetermined valid period are received from a security server, and security modules for various types of application programs of the terminal device are allowed to be frequently changed, thereby making the hacking of the application programs difficult and thus significantly improving the security of a user terminal device.

BACKGROUND ART

Recently, smartphones, which are mobile terminals, have become necessities essential for the life of today, and have been widely popularized all over the world. However, as the security vulnerability of smartphones has been continuously revealed, attacks via malicious applications have been rapidly increasing.

Hackers develop malicious applications for mobile terminals, insert malware into the malicious applications, and distribute the malicious applications disguised as normal applications to general users via open markets or the Internet. When a malicious application is installed on a mobile terminal, the malicious application inside the mobile terminal may attempt an attack for leaking not only personal information, such as Short Message Service (SMS) transmission and reception information, a telephone directory, Internet access records, etc., but also financial information, such as a mobile accredited certificate used for mobile banking, etc., to an external server without the knowledge of a user.

When an application is executed, most application security solutions invoke security logic and respond with results while communicating with the security module of the application. However, when communication with the security module is forcibly blocked or the security module is disarmed by an altered application by an attack of a hacker, fatal vulnerability related to personal information and financial information occurs.

Therefore, there is an urgent demand for the development of technology which can overcome a security vulnerability problem in a mobile terminal-based user environment widely popularized recently both locally and internationally and which can improve the security of various types of software included in user terminals.

SUMMARY OF THE DISCLOSURE

Accordingly, the present invention has been made to overcome the above-described problems of the prior art, and an object of the present invention is to provide a dynamic security module terminal device and a method of operating the same, in which dynamic security modules in each of which part or all of the code performing security management has a predetermined valid period are received from a security server, and security modules for various types of application programs of the terminal device are allowed to be frequently changed, thereby making the hacking of the application programs difficult and thus significantly improving the security of a user terminal device.

According to an aspect of the present invention, there is provided a dynamic security module terminal device for receiving a dynamic security module and transmitting a security management event to a security server, the dynamic security module terminal device including: a communication unit configured to transmit and receive a security management event over a network; and a processor configured to control the communication unit; wherein the processor is configured to: create a security session with a security server; and receive a dynamic security module from the security server so that part or all of code of the dynamic security module performing security management has a predetermined valid period.

The processor may be further configured to receive a security management examination result value from the security server.

The dynamic security module may be configured to stop the running of an application program installed on the terminal device when it is determined that a security problem has occurred in the terminal device as a result of the security management.

The processor may be configured to create the security session by receiving a session ID from the security server and then storing the received session ID.

The creation of the security session may be performed after authentication has been completed by the security server.

The predetermined valid period may be configured to delete the part or all of the code or block the use of the part or all of the code when the predetermined valid period expires.

The security management event may be configured to: transmit at least one type of information about the dynamic security module upon execution thereof, selected from the group consisting of the function name of the code of the dynamic security module, a variable designating an algorithm to be executed, a protocol field, a variable designating a protocol sequence, a variable designating a compile level, and a variable designating an executable code obfuscation method, to the security server; and allow whether the information upon execution is the same as the configuration of parameters regarding the dynamic security module stored in the security server to be verified.

The processor may be further configured to additionally receive encrypted signature information regarding the dynamic security module when receiving the dynamic security module from the security server.

A public key corresponding to the private key of the encrypted signature information may be set in the terminal device, and the encrypted signature information may be decrypted using the public key.

The processor may be further configured to: additionally receive information about the entry point of the code of the dynamic security module performing the security management when receiving the dynamic security module from the security server; and allow the dynamic security module to be executed from the entry point.

According to another aspect of the present invention, there is provided a method of operating a dynamic security module terminal device for receiving a dynamic security module and transmitting a security management event to a security server, the method including: creating a security session with a security server; and receiving a dynamic security module from the security server so that part or all of code of the dynamic security module performing security management has a predetermined valid period.

The method may further include receiving a security management examination result value from the security server.

The method may further include stopping the running of an application program installed on the terminal device when it is determined that a security problem has occurred in the terminal device as a result of the security management.

The security session may be created by receiving a session ID from the security server and then storing the received session ID.

The security management event may be configured to: transmit at least one type of information about the dynamic security module upon execution thereof, selected from the group consisting of a function name of the code of the dynamic security module, a variable designating an algorithm to be executed, a protocol field, a variable designating a protocol sequence, a variable designating a compile level, and a variable designating an executable code obfuscation method, to the security server; and allow whether the information upon execution is the same as the configuration of parameters regarding the dynamic security module stored in the security server to be verified.

According to still another aspect of the present invention, there is provided a computer-readable storage medium having stored thereon a computer program that, when executed by a processor, causes the processor to execute the method.

BRIEF DESCRIPTION OF THE DRAWINGS

The above and other objects, features and advantages of the present invention will be more clearly understood from the following detailed description taken in conjunction with the accompanying drawings, in which:

FIG. 3 is a schematic diagram showing examples of information upon execution of dynamic security modules based on session IDs in the dynamic security module terminal device according to the embodiment of the present invention;

DETAILED DESCRIPTION OF THE DISCLOSURE

Embodiments of the present invention will be described in detail with reference to the accompanying drawings. In the following description of the present invention, when it is determined that a detailed description of a related well-known component or function may unnecessarily make the gist of the present invention obscure, it will be omitted. Furthermore, in the following description of the embodiments of the present invention, a specific numerical value is merely an embodiment.

Figure 1:
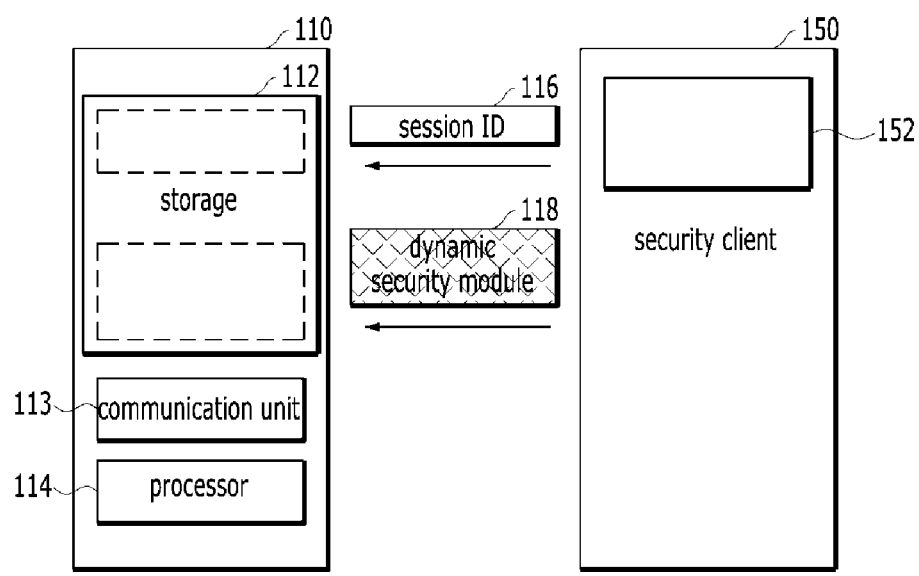
FIG. 1 is a block diagram showing the schematic configuration of a dynamic security module terminal device according to an embodiment of the present invention.
Figure 2:
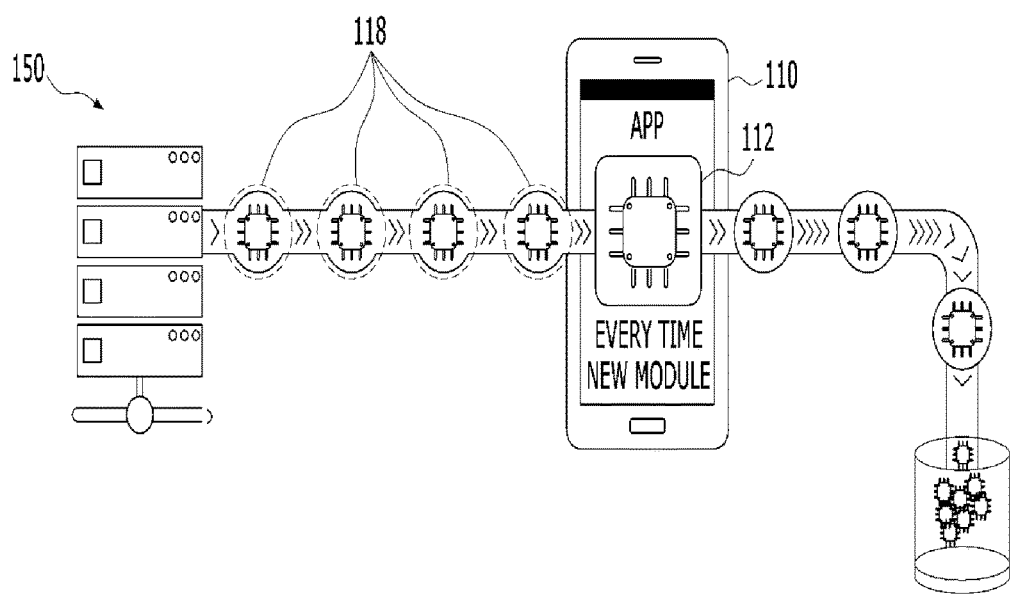
FIG. 2 is a schematic diagram showing the operation of receiving dynamic security modules in the dynamic security module terminal device according to the embodiment of the present invention.

FIG. 1 is a block diagram showing the schematic configuration of a dynamic security module terminal device 110 according to an embodiment of the present invention, FIG. 2 is a schematic diagram showing the operation of receiving dynamic security modules in the dynamic security module terminal device 110 according to the present embodiment, and FIG. 3 is a schematic diagram showing examples of information upon execution of dynamic security modules based on session IDs in the dynamic security module terminal device 110 according to the embodiment of the present invention.

Referring to these drawings, the dynamic security module terminal device 110 according to the present invention is a dynamic security module terminal device which receives a dynamic security module 118 and which transmits a security management event to a security server 150. The dynamic security module terminal device 110 includes a communication unit 113 configured to transmit and receive a security management event over a network, and a processor 114 configured to control the communication unit 113. The processor 114 is configured to create a security session with the security server 150, and to receive the dynamic security module 118 from the security server 150 so that part or all of the code of the dynamic security module 118 performing security management has a predetermined valid period.

In other words, in the dynamic security module terminal device 110 according to the present embodiment, the processor 114 is configured to receive dynamic security modules 118 in each of which part or all of the code performing security management has a predetermined valid period, to create a security session with the security server 150 in one of various cases, such as in the case where the terminal device 110 operates, in the case where an application program installed on the terminal device 110 runs, in the case of a user request from the terminal device 110, at a predetermined period set by the security server 150, at a predetermined period set by the terminal device 110, etc., and to store the dynamic security modules 118 in storage 112, thereby allowing the dynamic security modules 118 to be frequently updated and thus effectively preventing a security problem from occurring in application programs installed on the user terminal due to the hacking of a security module, computer virus infection, or the like.

Furthermore, rather than repeatedly receiving the same type of dynamic security module, the processor 114 may receive at least two dynamic security modules having different code structures or algorithms, varying in one or more variable portions selected from the group consisting of, for example, the function name of code for performing security management, a variable designating an algorithm to be executed, a protocol field, a variable designating a protocol sequence, a variable designating a compile level, and a variable designating an executable code obfuscation method, from the security server 150.

Furthermore, the predetermined valid period of the part or all of the code of the dynamic security module 118 performing the security management may be set to a time interval selected from the group consisting of, for example, one hour, three hours, six hours, nine hours, 12 hours, 24 hours, 48 hours, and 72 hours. When the set period expires, the function of the part or all of the code of the dynamic security module 118 may be stopped. Accordingly, when the predetermined valid period of the dynamic security module 118 expires, the terminal device 110 may stop the use of the dynamic security module 118, may receive a new dynamic security module 118 from the security server 150, and may perform update, thereby effectively preventing a security problem from occurring in the terminal device 110 due to the hacking of the dynamic security module 118 or computer virus infection.

In this case, the security management is a concept including overall management which is performed by the dynamic security module 118 for the purpose of the security of the terminal device 110, such as: detecting whether an element which may be a hacking threat to an application program installed on the terminal device 110 is present; detecting hacking threat elements, including the forgery or alteration of the O/S of the terminal device 110 on which the application program has been installed, the forgery or alteration of an app, rooting, debugger and root process execution histories, the installation of a malicious application, a malicious application execution history, a malicious port, the forgery or alteration of a session, the forgery or alteration of an input value, and a computer virus; transmitting information about the hacking threat elements to the security server 150; treating a computer virus related to an application program; transmitting a stop command to stop the running of the application program in order to prevent a hacking threat and a computer virus infection problem from occurring in the application program; stopping the function of the dynamic security module 118 itself due to a problem, such as the expiration of the predetermined valid period of the dynamic security module 118, the hacking of a hacker, computer virus infection, or the like; etc.

Furthermore, the security management event which is transmitted to the security server 150 may be one of various events, such as the information details upon execution used to determine the parameters of the dynamic security module 118 received from the security server 150, the details of the states in which the dynamic security module 118 runs, security management result information indicating that there has been a hacking threat, the details of the treatment of computer viruses for an application program installed on the terminal device 110, etc.

Furthermore, the terminal device 110 may be one of various terminals requiring security, such as a smartphone, a tablet PC, a desktop computer, a notebook computer, etc.

The processor 114 may generate control signals and control the terminal device 110 including the communication unit 113 and storage 112. In this case, the communication unit 113 may exchange data with an external device through communication using various protocols, and may connect with an external network via a wired or wireless connection and transmit and receive digital data, such as content, an application, etc.

Furthermore, the storage 112 is a device capable of storing various types of digital data including an audio, a photo, a moving image, an application, etc. The storage 112 refers to one of various types of digital data storage spaces, such as flash memory, Random Access Memory (RAM), Solid State Drive (SSD), etc. The storage 112 may temporarily store data received from an external device via the communication unit 113.

The processor 114 or dynamic security module 118 may be further configured to transmit security management results to the security server 150 and to receive a security management examination result value from the security server 150. In other words, the processor 114 controlling the communication unit 113 of the terminal device 110 may transmit security management results in connection with the security server 150, and may perform the function of communication control adapted to receive a security management examination result value from the security server 150. Alternatively, the dynamic security module 118 installed on the terminal device 110 may directly transmit security management results in connection with the security server 150, and may perform the function of communication control adapted to receive a security management examination result value from the security server 150. Accordingly, when any one of the terminal device 110 and the dynamic security module 118 is hacked or infected with a computer virus, they may perform security management while performing communication with the security server 150 in an alternative manner, thereby further improving the security of the terminal device 110.

In this case, the security management results are the details of security management which has been actually performed by the dynamic security module 118 in the terminal device 110. The security management results are the result values of the performance of detailed security management functions included in the dynamic security module 118, and are part of a security management event. For example, the security management results may be the details of the result of the detection of the presence or absence of an element which may be a hacking threat, the result of the detection of an element which may be a hacking threat, the result of the treatment of a computer virus for an application program, the result of the removal of an element which may be a hacking threat, etc.

Furthermore, the security management examination result value is a determination result obtained when the security server 150 receives the security management results and analyzes whether a security problem has occurred in the terminal device 110 based on the security management results. In other words, the security management examination result value may be the result of the determination of whether an element which may be a current hacking threat to the terminal device 110 is present, the result of the determination whether an application program installed on the terminal device 110 has been hacked, or the result of the determination of whether an application program has been infected with a computer virus or malware.

More specifically, the terminal device 110 transmits the results of security management, performed by the dynamic security module 118, to the security server 150, and the security server 150 generates a security management examination result value by analyzing and determining the security management results, and transmits the generated security management examination result value to the dynamic security module 118 of the terminal device 110. Accordingly, the dynamic security module 118 may become aware of whether a security problem has occurred based on the security management examination result value, and may take appropriate measures.

More specifically, when a security problem has occurred in the terminal device 110 as a result of the security management, the dynamic security module 118 may transmit a stop command to stop the running of an application program installed on the terminal device 110. In other words, when a security problem has occurred in the terminal device 110 as a result of the security management, the dynamic security module 118 may transmit such a stop command to the application program before transmitting security management results to the security server 150.

Alternatively, the dynamic security module 118 may transmit such a stop command to the application program after receiving the security management examination result value from the security server 150 and becoming aware of whether a security problem has occurred. Accordingly, the problem in which a hacker hacks the dynamic security module 118 and causes a security problem in various types of application programs of the terminal device 110 can be fundamentally prevented.

In other words, when a security problem has occurred in the terminal device 110, the running of an application program installed on the terminal device 110 is rapidly stopped. As a result, the security problem can be prevented from being additionally spread to other application programs installed on the terminal device 110 by the running of the former application program, and the tracking and analysis of the dynamic security module 118 or security server 150 by a hacker can be rapidly blocked by discarding a security session.

The processor 114 may create the security session by receiving a session ID from the security server 150 and storing it.

In other words, the security server 150 may create the security session by generating and storing a session ID 116 as a security session ID and transmitting the session ID 116 to the terminal device 110 so that the session ID 116 can be stored in the storage 112. This method of creating a security session using a session ID has the advantage of creating a plurality of security sessions and frequently updating the security sessions, thereby improving the reliability and convenience of the security management of the dynamic security module 118 for the terminal device 110.

In this case, the creation of the security session may be performed after authentication from the security server 150 has been completed. In other words, the creation of the security session may include the authentication of the terminal device 110 for the security server 150 in order to further improve the security of the terminal device 110.

Furthermore, the authentication of the terminal device 110 may be completed, for example, at the same time that an application, i.e., an application program including the dynamic security module, is installed on the terminal device 110, when an application is first run after being installed on the terminal device 110, upon logging in to or logging out of an application, or in response to a request from a user via an application after the application has been installed on the terminal device 110.

The predetermined valid period may be configured to delete part or all of code or block the use of part or all of code when the valid period expires. In other words, the dynamic security module 118 in which part or all of the code performing security management in the terminal device 110 has a predetermined valid period may be configured to delete the part or all of the code or stop the use of itself not to perform security management when the predetermined valid period expires.

Accordingly, when the predetermined valid period of the dynamic security module 118 expires, the terminal device 110 may update part or all of code constituting the dynamic security module 118, thereby fundamentally preventing a security problem from occurring due to a cause, such as the hacking of the dynamic security module 118, infection with a computer virus, or the like.

The security management event may include an event which, while the security session is being maintained, transmits information about the dynamic security module upon execution thereof, including at least one selected from the group consisting of the function name of code for the dynamic security module 118, a variable adapted to designate an algorithm to be executed, a protocol field, a variable adapted to designate a protocol sequence, a variable adapted to designate a compile level, and a variable adapted to designate an executable code obfuscation method, to the security server 150 and allows whether the information upon execution is the same as the configuration of the parameters of the dynamic security module 118 stored in the security server 150.

In this case, the parameters regarding the dynamic security module 118 is specific information about the function name of code adapted to perform the security management of the dynamic security module transmitted to the terminal device 110 and performing security management, a variable adapted to designate an algorithm to be executed, a protocol field, a variable adapted to designate a protocol sequence, a variable adapted to designate a compile level, a variable adapted to designate an executable code obfuscation method, etc. The parameters regarding the dynamic security module 118 are intended to distinguish individual dynamic security modules which are frequently updated and have different configurations, and are determined by the security server 150. The parameters regarding the dynamic security module 118 are information when the code adapted to perform the security management of the dynamic security module 118 is executed.

In the verification of the parameters of the dynamic security modules, when it is determined that the sequentially transmitted parameters of the dynamic security modules, for example, A-B-C-D, are different from details transmitted from the terminal device 110 through comparison therebetween, it may be inferred that there has been a hacking attempt of a hacker or the like, and countermeasures against this may be taken.

Figure 4:
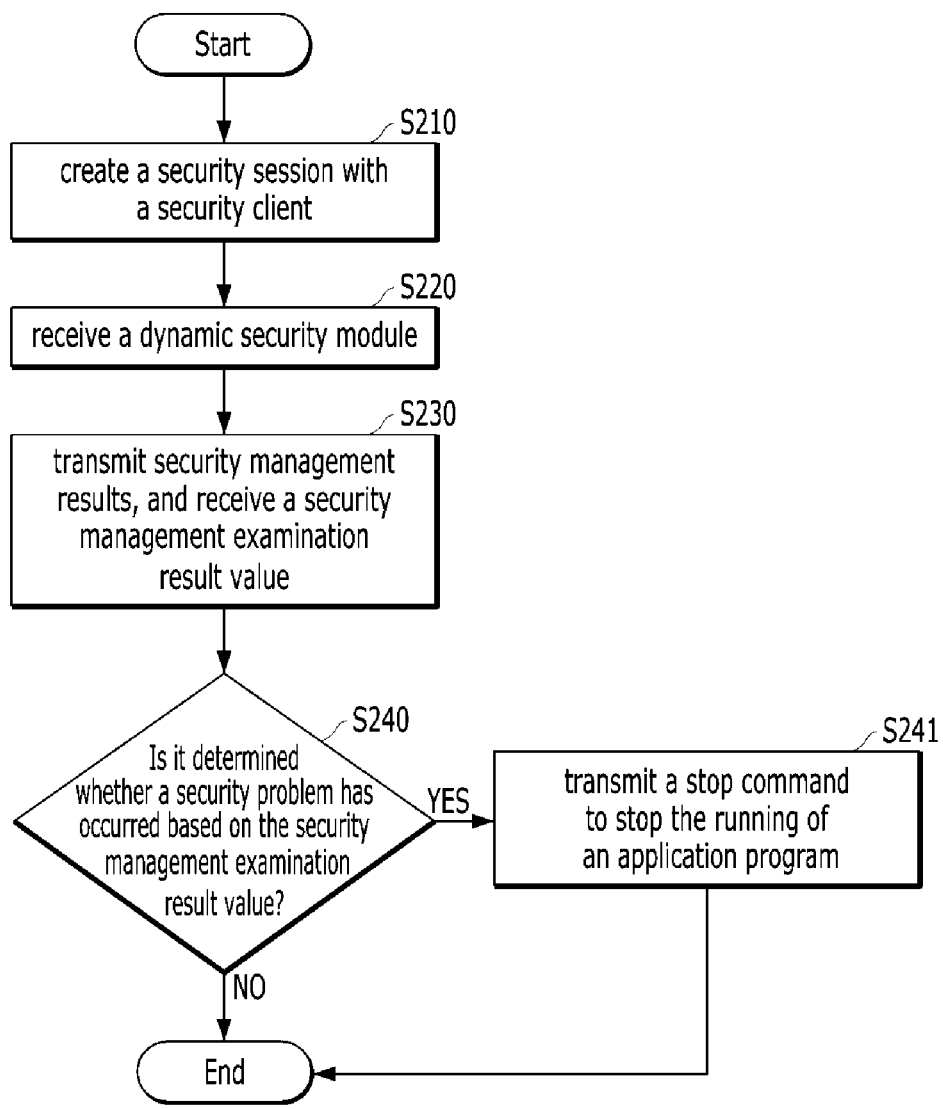
FIG. 4 is a flowchart showing a method of operating a dynamic security module terminal device according to a first embodiment of the present invention.

More specifically, as shown in FIG. 4, when the security server 150 and the terminal device 110 have created a security session by generating 11836381 as a session ID, it may be verified whether details regarding the dynamic security module 118 transmitted from the terminal device 110 are parameters A, B, and C and states 1, and 2. When the security server 150 and the terminal device 110 have created a security session by generating 72365784 as a session ID, it may be verified whether details regarding the dynamic security module 118 transmitted from the terminal device 110 are parameters C, B, and A and states 0, and 3. Furthermore, when the security server 150 and the terminal device 110 have created a security session by generating 87656501 as a session ID, it may be verified whether details regarding the dynamic security module 118 transmitted from the terminal device 110 are parameters B, A, and C and states 3, and 2. In this case, the details of the parameters and the states may be security management events transmitted from the terminal device 110.

The security management may be configured to transmit the protocol fields and protocol sequences of individual dynamic security modules 118, received by the terminal device 110, to the security server 150, and to perform verification by comparing the protocol fields and protocol sequences stored in the security server 150 with the transmitted protocol fields and protocol sequences.

In other words, the security management may be configured to transmit the protocol fields and protocol sequences of the dynamic security modules 118, received by the terminal device 110, to the security server 150 and to allow them to be analyzed, thereby inferring that an attempt to perform hacking has been made by a hacker, for example, when at least one error has occurred during the performance of a protocol. Accordingly, based on the results of the analysis of the protocol fields and protocol sequences of the dynamic security modules 118, a hacking risk or the possibility of the occurrence of a security problem may be predicted, and countermeasures may be taken to prevent a security problem from occurring.

In this case, the protocol field is a protocol for performance methods, etc. regarding various items of the security management which is performed by the dynamic security module 118 in the terminal device 110. For example, the protocol field may be a communication protocol adapted to transmit the result of the determination of whether an element which may be a hacking threat to an application program installed on the terminal device 110 is present, or a communication protocol adapted to transmit the details of the self treatment of a file computer virus for the application program, a file boot & file computer virus, and/or the like.

Furthermore, the protocol sequence refers to the performance sequence of various items including the security management which is performed by the dynamic security module 118 in the terminal device 110. For example, the protocol sequence is the sequence of the detection of hacking threat elements, including the forgery or alteration of the O/S of the terminal on which an application program has been installed, the forgery or alteration of an app, rooting, a debugger, a root process execution history, the installation of a malicious application, a malicious application execution history, a malicious port, the forgery or alteration of a session, the forgery or alteration of an input value, and a computer virus.

The processor 114 may be configured to receive encrypted signature information regarding the dynamic security module 118 when additionally receiving the dynamic security module 118 from the security server 150, thereby enabling whether the dynamic security module 118 is a genuine dynamic security module transmitted by the normal security server 150 or a dynamic security module transmitted by a security server hacked by a hacker or the like and including a hacking threat element for the terminal device 110 to be verified.

The verification of the dynamic security module 118 may be performed by, for example, setting a public key, corresponding to the private key of the encrypted signature information, in the terminal device 110 and decrypting the encrypted signature information by means of the public key, thereby providing an additional security means for the signature information itself and further improving the reliability of the dynamic security module 118.

Furthermore, the processor 114 may be configured to additionally receive information about the entry point of the code of the dynamic security module 118 performing the security management when receiving the dynamic security module 118 from the security server 150, thereby enabling the dynamic security module 118 to be executed from the entry point.

In other words, in order to make the hacking of a hacker more difficult when the dynamic security module 118 runs on the terminal device 110, whenever the security server 150 transmits the dynamic security module 118, a dynamic security module in which code performing security management has a different entry point may be transmitted and installed on the terminal device 110, thereby improving the security of the terminal device 110 and also enhancing the reliability of the dynamic security module 118.

Figure 5:
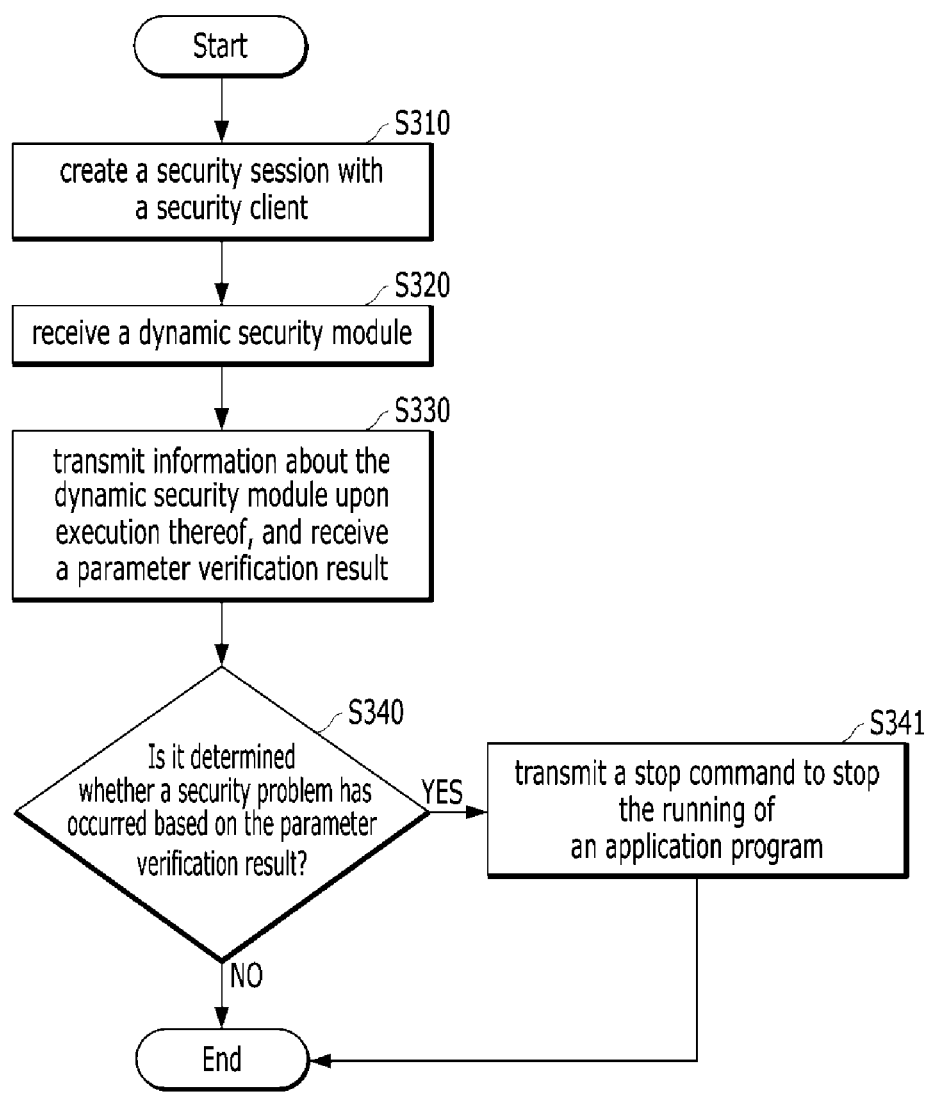
FIG. 5 is a flowchart showing a method of operating a dynamic security module terminal device according to a second embodiment of the present invention.

FIG. 4 is a flowchart showing a method of operating a dynamic security module terminal device according to a first embodiment of the present invention, and FIG. 5 is a flowchart showing a method of operating a dynamic security module terminal device according to a second embodiment of the present invention.

Referring to these drawings, the method of operating a dynamic security module terminal device according to the first embodiment of the present invention is a method of operating a dynamic security module terminal device which receives a dynamic security module and which transmits a security management event to a security server. This method of operating a dynamic security module terminal device includes: step S210 of creating a security session with a security server; and step S220 of receiving a dynamic security module from the security server so that part or all of the code of the dynamic security module performing security management has a predetermined valid period.

This method of operating a dynamic security module terminal device further includes: step S230 of transmitting the results of security management, performed by the dynamic security module in the terminal device, to the security server, and receiving a security management examination result value from the security server; and step 240 of determining whether a security problem has occurred based on the security management examination result value. In this case, the process of the present method ends when it is determined that a security problem has not occurred based on the security management examination result value. In contrast, when it is determined that a security problem has occurred based on the security management examination result value, step S241 of transmitting a stop command to stop the running of an application program included in the terminal device is further performed. In this case, the stop command to stop the running of an application program may be conducted by the dynamic security module.

Furthermore, the method of operating a dynamic security module terminal device according to the second embodiment of the present invention is a method of operating a dynamic security module terminal device which receives a dynamic security module and which transmits a security management event to a security server. This method of operating a dynamic security module terminal device includes: step S310 of creating a security session with a security server; and step S320 of receiving a dynamic security module from the security server so that part or all of code of the dynamic security module performing security management has a predetermined valid period.

This method of operating a dynamic security module terminal device further includes: step S330 of transmitting information about the dynamic security module upon execution thereof to the security server, and receiving the verification result of the parameters of the dynamic security module from the security server; and step 340 of determining whether a security problem has occurred based on the verification result of the parameters of the dynamic security module. In this case, it is determined that a security problem has not occurred based on the verification result of the parameters of the dynamic security module. In contrast, it is determined that a security problem has occurred based on the verification result of the parameters of the dynamic security module, step S341 of transmitting a stop command to stop the running of an application program included in the terminal device is further performed. In this case, the stop command to stop the running of an application program may be conducted by the dynamic security module.

Each of the methods of operating a dynamic security module terminal device according to the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software.

The dynamic security module terminal device and the method of operating the same according to the present invention have the advantage of receiving dynamic security modules in each of which part or all of the code performing security management has a predetermined valid period from a security server, and allowing security modules for various types of application programs of the terminal device to be frequently changed, thereby making the hacking of the application programs difficult and thus significantly improving the security of a user terminal device.

While the present invention has been described in conjunction with specific details, such as specific components, and limited embodiments and diagrams above, these are provided merely to help an overall understanding of the present invention. The present invention is not limited to these embodiments, and various modifications and alterations can be made based on the foregoing description by those having ordinary knowledge in the art to which the present invention pertains.

Therefore, the technical spirit of the present invention should not be determined based only on the described embodiments, and the following claims, all equivalents to the claims and equivalent modifications should be construed as falling within the scope of the spirit of the present invention.

What is claimed is:

1. A dynamic security module terminal device comprising:
   a receiver to receive a dynamic security module from a security server over a network;
   a transmitter to transmit a security management event to the security server over the network; and
   a processor configured to:
      create a security session with the security server;
      receive the dynamic security module from the security server;
      change a code of the dynamic security module based on a first set of parameters of the dynamic security module designated by the security server;
      transmit the security management event to the security server, wherein the security management event includes a second set of parameters of the dynamic security module that is running on the security client;
      receive a security management examination result from the security server, wherein the security management examination result includes whether the second set of parameters of the dynamic security module that is running on the security client match with the first set of parameters that are designated by the security server for the security session; and
      stop running of an application program in response to receiving the security management examination result that the second set of parameters is different from the first set of parameters,
   wherein the first and second sets of parameters include at least one of a function name, a variable that designates an algorithm to be executed, a protocol field, a variable that designates a protocol sequence, a variable that designates a compile level, or a variable that designates an executable code obfuscation method, and
   wherein the security session has a predetermined valid period after which part or all of the code of the dynamic security module is changed.

2. The dynamic security module terminal device of claim 1, wherein the dynamic security module is configured to stop running of the application program installed on the terminal device when it is determined that a security problem has occurred in the terminal device as a result of the security management other than expiration of the predetermined valid period.

3. The dynamic security module terminal device of claim 1, wherein the processor is configured to create the security session by receiving a session ID from the security server and then storing the received session ID.

4. The dynamic security module terminal device of claim 1, wherein the creation of the security session is performed after authentication has been completed by the security server.

5. The dynamic security module terminal device of claim 1, wherein use of the part or all of the code is blocked when the predetermined valid period expires.

6. The dynamic security module terminal device of claim 1, wherein the processor is further configured to additionally receive encrypted signature information regarding the dynamic security module when receiving the dynamic security module from the security server.

7. The dynamic security module terminal device of claim 6, wherein a public key corresponding to a private key of the encrypted signature information is set in the terminal device, and the encrypted signature information is decrypted using the public key.

8. The dynamic security module terminal device of claim 1, wherein the processor is further configured to:
   additionally receive information about an entry point of the code of the dynamic security module performing the security management when receiving the dynamic security module from the security server; and
   allow the dynamic security module to be executed from the entry point.

9. The dynamic security module terminal device of claim 1, wherein the part or all of the code is deleted when the predetermined valid period expires.

10. The dynamic security module terminal device of claim 1, wherein the security management examination result comprises details of the security management that has been performed by the dynamic security module in the terminal device.

11. A method of operating a dynamic security module terminal device, the method comprising:
   creating, with a processor, a security session with a security server;
   receiving, by the processor, a dynamic security module from the security server;
   changing a code of the dynamic security module based on a first set of parameters of the dynamic security module designated by the security server;
   transmitting the security management event to the security server, wherein the security management event includes a second set of parameters of the dynamic security module that is running on the security client;
   receiving a security management examination result from the security server, wherein the security management examination result includes whether the second set of parameters of the dynamic security module that is running on the security client match with the first set of parameters that are designated by the security server for the security session; and stopping running of an application program in response to receiving the security management examination result that the second set of parameters is different from the first set of parameters, wherein the first and second sets of parameters include at least one of a function name, a variable that designates an algorithm to be executed, a protocol field, a variable that designates a protocol sequence, a variable that designates a compile level, or a variable that designates an executable code obfuscation method, and wherein the security session has a predetermined valid period after which part or all of the code of the dynamic security module is changed.

12. The method of claim 11, further comprising stopping running of the application program installed on the terminal device when it is determined that a security problem has occurred in the terminal device as a result of the security management other than expiration of the predetermined valid period.

13. The method of claim 11, wherein the security session is created by receiving a session ID from the security server and then storing the received session ID.

14. The method of claim 11, further comprising deleting by the processor the part or all of the code when the predetermined valid period expires.

15. The method of claim 11, further comprising blocking by the processor use of the part or all of the code when the predetermined valid period expires.

16. The method of claim 11, wherein the security management examination result comprises details of the security management that has been performed by the dynamic security module in the terminal device.

* * * * *